(12) United States Patent
Salzinger et al.

(10) Patent No.: US 7,346,552 B1
(45) Date of Patent: Mar. 18, 2008

(54) SYSTEM AND METHOD FOR THE ENABLEMENT OF ELECTRONIC COMMERCE IN A CONTENT NETWORK

(75) Inventors: Steven Mark Salzinger, New York, NY (US); Jeffrey Charles Sherwin, New York, NY (US); Takeshi Leland Toyohara, New York, NY (US); Russell Ian Zack, New York, NY (US); Nickolas James Heudecker, Ypsilanti, MI (US)

(73) Assignee: Cauldron Solutions, LLC, New York, NY (US)

( * ) Notice: Subject to any disclaimer, the term of this patent is extended or adjusted under 35 U.S.C. 154(b) by 629 days.

(21) Appl. No.: 10/359,770

(22) Filed: Feb. 7, 2003

Related U.S. Application Data

(60) Provisional application No. 60/374,830, filed on Apr. 24, 2002.

(51) Int. Cl.
 *G06Q 30/00* (2006.01)
(52) U.S. Cl. ..................................... 705/26
(58) Field of Classification Search ................. 705/26, 705/27
 See application file for complete search history.

(56) References Cited

U.S. PATENT DOCUMENTS

| | | | |
|---|---|---|---|
| 5,717,923 A | 2/1998 | Dedrick | |
| 5,864,823 A | 1/1999 | Levitan | |
| 5,960,411 A * | 9/1999 | Hartman et al. | 705/26 |
| 6,308,327 B1 | 10/2001 | Liu et al. | |
| 6,330,719 B1 | 12/2001 | Zigmond et al. | |
| 6,385,592 B1 | 5/2002 | Angles et al. | |
| 6,944,669 B1 * | 9/2005 | Saccocio | 709/229 |

FOREIGN PATENT DOCUMENTS

| | | |
|---|---|---|
| EP | 1185116 A2 | 3/2002 |
| EP | 1207695 A1 | 5/2002 |
| WO | WO99/45701 | 9/1999 |
| WO | WO 02/19689 A2 | 3/2002 |
| WO | WO 03/058534 A1 * | 7/2003 |

OTHER PUBLICATIONS

Patrick Mitchell "Open Profiling System introduced to protect online privacy.", Computer Shopper, v16, n9, p. 91(2). Retrieved from Dialog File: 275, Acc#: 02090463.*

"Digital TV: The Future of E-Commerce," http://www.ecommercetimes.com/perl/story/2770.html.

(Continued)

*Primary Examiner*—Naeem Haq
(74) *Attorney, Agent, or Firm*—Sofer & Haroun, LLP

(57) ABSTRACT

A system and method for automatically storing and loading consumer information into commercial transaction pages facilitates electronic commerce in a content network. Consumer information can be stored through registration or through system interaction and is associated with tags from commercial participants which are stored based upon informational needs for consummating transactions. New commercial participants are easily integrated into the present system through storage and association of tags or target content markers. Commercial participant branding is maintained, and entry of consumer information is minimized and simplified.

2 Claims, 7 Drawing Sheets

OTHER PUBLICATIONS

"The Modeling of Structured Context-Aware Interactive Environments," http://www.sdpsnet.org/journals/Vol 5-4/Santos-5.pdf.

"Modeling of User Interaction in Contect-Aware Interactive Television Application on Distributed Environments," http://www.di.unito.it/-liliana/UM01/santos.pdf.

"Press Releases," http://www.predictivenetworks.com/news/press0642001.html.

"Tuning in to iTV," http://www-106.ibm.com/developerworks/xml/library/x-xitv.html?dwzone=xml.

* cited by examiner

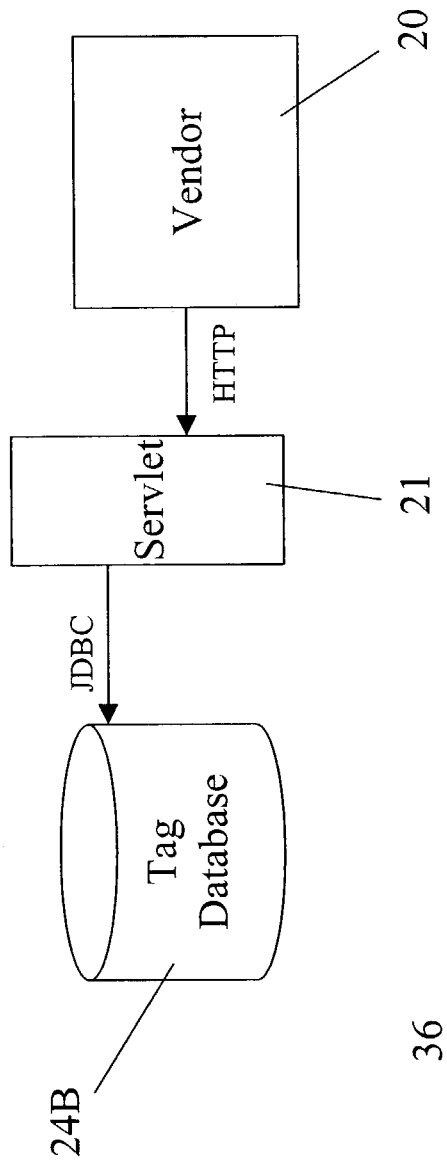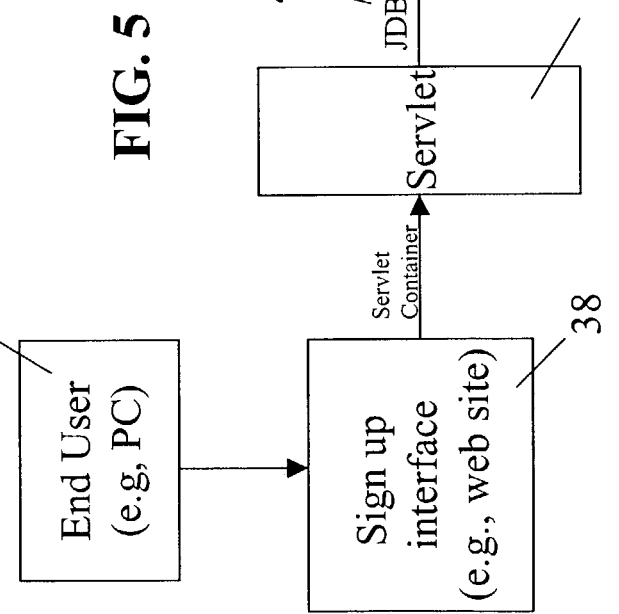

SYSTEM AND METHOD FOR THE ENABLEMENT OF ELECTRONIC COMMERCE IN A CONTENT NETWORK

CROSS-REFERENCE TO RELATED APPLICATION

This application claims the benefit of U.S. provisional application Ser. No. 60/374,830 entitled "System and Method for the Enablement of Electronic Commerce in Limited Input Environments" filed Apr. 24, 2002.

FIELD OF THE INVENTION

The present invention relates to electronic commerce and transactions, and more particularly, to a system and method for facilitating transactions for consumers and commercial entities operating within networks which may offer limited input environments, such as interactive television systems.

BACKGROUND OF THE INVENTION

Interactive television is a relatively new phenomenon. Through interactive television, television viewers can use their remote controls or other input devices to affect what is seen and what functionality can be invoked on the television screen. Interactive television moves consumers to actively participate in television. Various forms of functionality, content and applications can be invoked with interactive television, including selecting information to be scrolled like a "ticker" across a portion of the television screen. Such information might be related to sports, weather, news, the stock market, or other information found to be of interest.

Consumer interaction through the television or over wireless devices is currently a difficult task, due in part to poor consumer/service provider interfaces and in part to strict agreements between service providers and their commercial partners. It is obviously advantageous for cable and wireless service providers to be able to provide their customers with the ability to interact with third party commercial partners. However, the service provider typically reaches individual agreements with each specific partner on both a business and technical level, thereby hindering scalability for each commercial partner. For example, the technical level agreement may not only contain mandates on connections and protocols, but also which specific information the partner is looking for on a screen or session level basis, and where that information can be entered by the customer. This can include applications that require completed input fields from the customer through remote controls such as "request for information" advertisements, television-commerce order forms, or games. With the increasing disparity of equipment, software, and environments, third party content providers have difficulty successfully deploying this content and applications in varied environments.

With regard to consumer/service provider interfaces, traditional purchasing methods by television-watching consumers have required the consumer to place a telephone call or log in to an Internet web site to purchase the materials shown on television. Once logged in, the consumer is required to enter text in text fields and make other selections in appropriate dialog boxes to convey necessary information to the vendor, such as billing and shipping information. Both of these methods require an investment of time and effort on the part of the consumer, which can lead to lost sales opportunities. Customization would improve customer interaction, but service providers and commercial partners typically find it unduly burdensome to customize on an individual consumer basis.

There is thus a need for a method of empowering television-watching consumers and wireless Internet surfers with simple access and functionality for purchasing items of interest discovered while interacting with their devices. There is also a need for a system for facilitating automated and simplified presentation of commercial partner information over a content network to users of devices having limited input environments.

By the present invention, there is provided a system and method for automatically storing and loading consumer information into commercial transaction pages. Consumer information can be stored through registration or through system interaction and is associated with tags from commercial participants which are stored based upon informational needs for consummating transactions. New commercial participants are easily integrated into the present system through storage and association of tags or target content markers. Commercial participant branding is maintained, and entry of consumer information is minimized and simplified.

BRIEF DESCRIPTION OF THE DRAWINGS

FIGS. 5 through 8 show the interaction of the various components of the present invention in connection with the initiation and execution of end user and vendor-side activity.

DETAILED DESCRIPTION OF THE PREFERRED EMBODIMENTS

The following terms are defined to enhance the understanding of the invention, but the definitions contained should not be read in a limiting sense.

1. Provider or Operator: Network operator such as a cable or wireless service provider.

2. Vendor or Commercial Partner: Third party seller of goods and services.

3. Customer or Consumer: Cable service user and consumer of goods and services.

4. Protocol: Means of connection between Customer and Commercial Partner (ie. HTTP/MFS). In one embodiment, the present invention takes the form of a plug-able module for any J2EE compliant application server written in Java™ that intercepts the stream of information between the customer and vendor while still within the confines of the provider's network.

5. Tags: Embedded information keys, such as HTML or XML embedded keys, for customer specific values which can be agreed upon at time of Provider/Vendor agreement.

6. Environment: The private connections between the customer, the provider, and the vendor communicated via pre-determined protocol.

7. Dialogs: Interactive user interface objects displayed by the browser (such as text fields, text areas, check boxes, radio buttons, and list boxes).

8. Standard Information: Groups of values to specific tags that are common across most vendors (such as billing and shipping information).

9. Non-Standard Information: Unique user session information or groups of values to specific tags that are not frequently used by more than one vendor.

10. Page: User interface presentation screen.

11. Data entry page: The page provided by the present invention on the device or television set top browser for entering standard or non-standard information.

12. Data selection page: The page generated by the present invention at the point of sale for the customer to easily select which information to use for the transaction.

In the embodiment of the invention as shown in FIGS. 1 through 8, there is provided a commerce and transaction platform 10 for use in network platforms having limited user input capabilities, such as interactive television systems or wireless Internet service provider systems. The limitations on consumer input can be inherent, such as where an input device has no keyboard, or can be based on convenience, such as where a binary selection may take a user a few seconds, but a longer field entry may take one or more minutes. The system of the present invention can specifically handle the needs of cable and wireless service providers that have agreements with specific vendors to be able to sell products and/or services to the providers' customers.

I. Holds Preference Data

Figure 1:
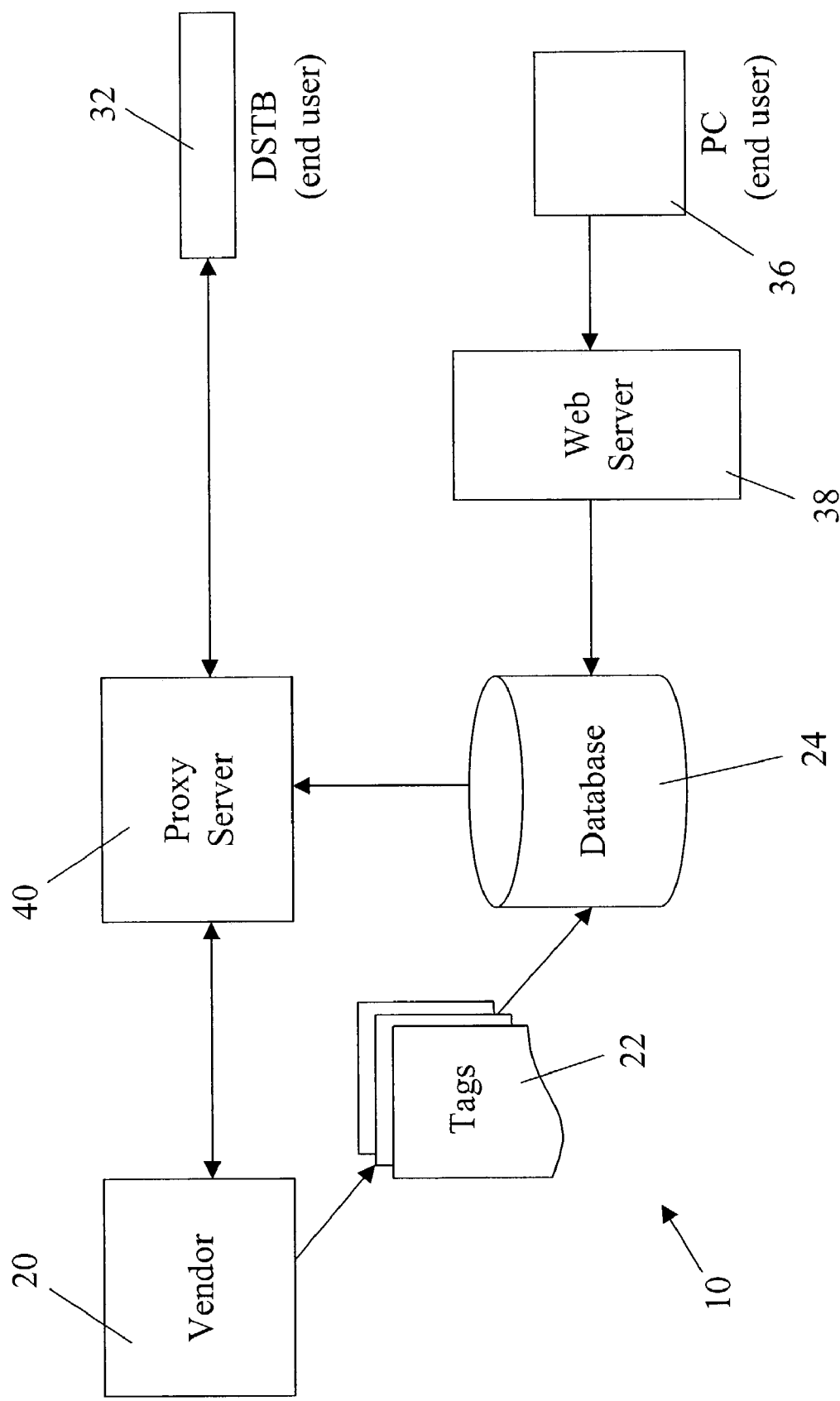
FIG. 1 shows a schematic of the data flow in accordance with one embodiment of the present invention.
Figure 7:
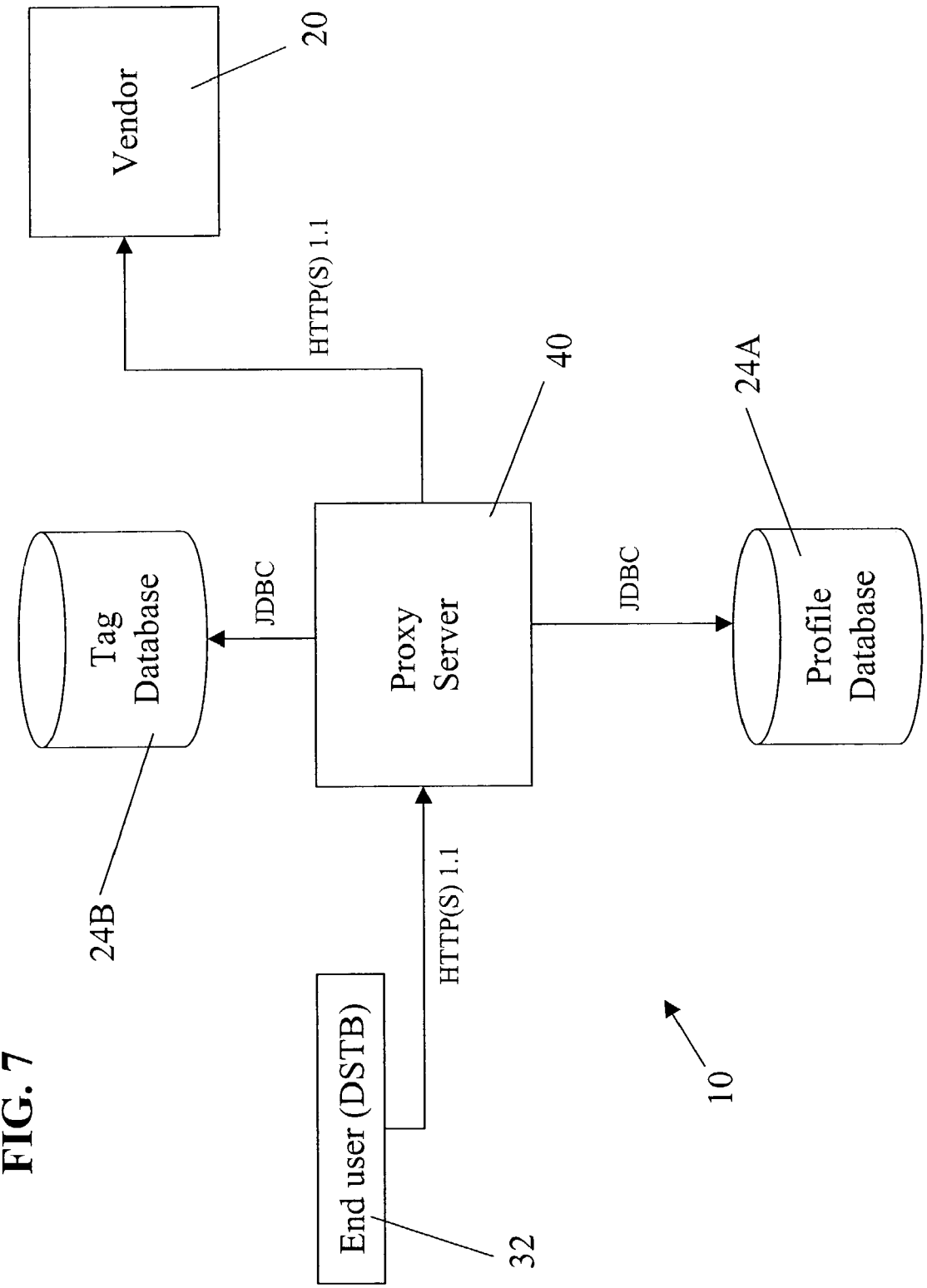

As shown in FIGS. 1 and 7, the present invention provides a commerce transaction application system 10, which can incorporate a subscriber profile management and digital wallet service to serve consumers using a variety of limited input devices. The present invention allows users to store various types of information, including billing and shipping addresses, credit card data, and partner-specific preference data, regardless of type or quantity. User, profile, type or any number of semantics can be used to organize this information in database 24.

II. Auto Fills Preference Data a. Data Insertion

Figure 3:
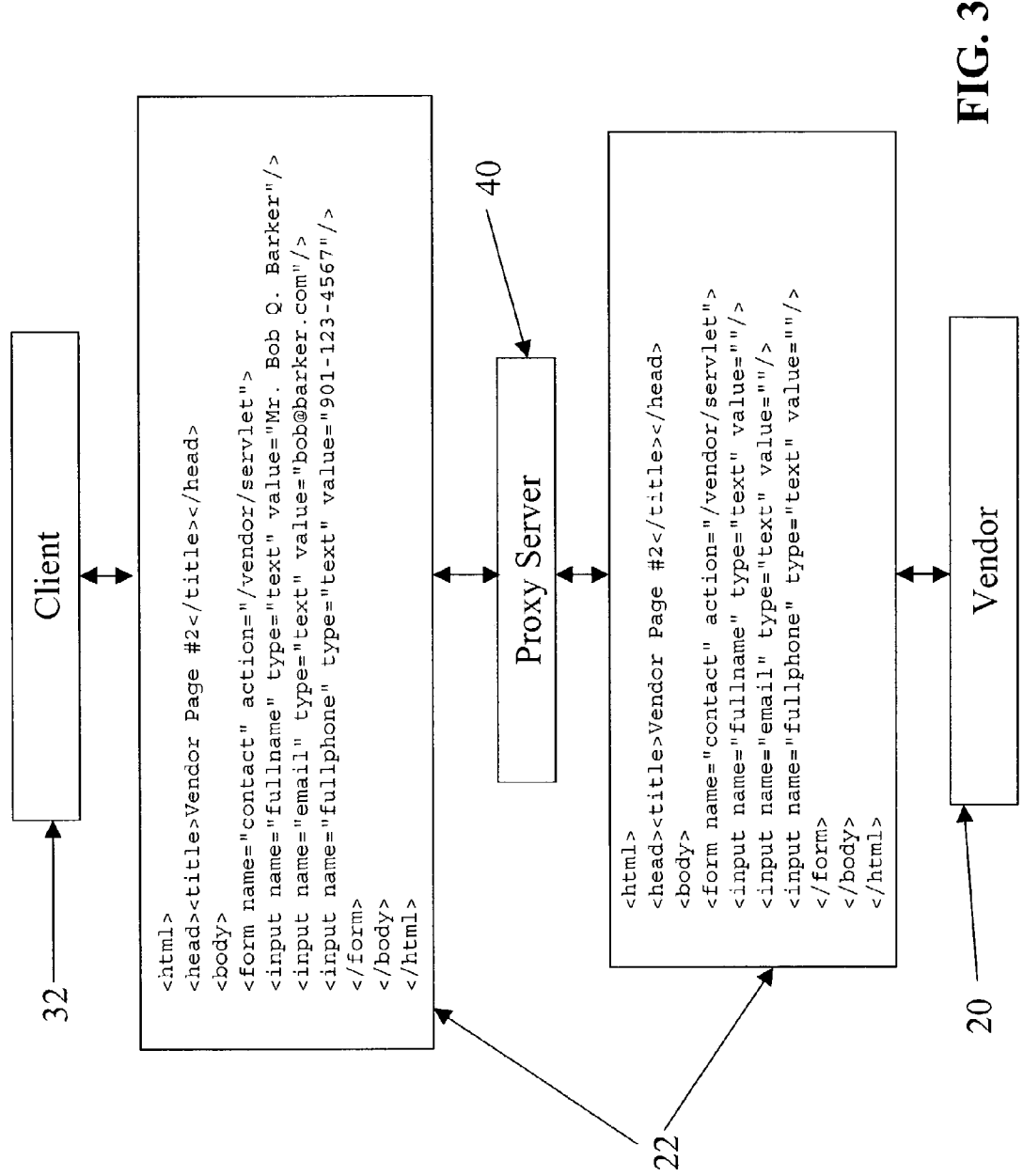
FIG. 3 is a diagram illustrating vendor integration using markup transformation in accordance with one embodiment of the present invention.

The present invention was designed for usability; if a consumer is using a device with restrictive input methods, such as a digital cable set-top box 32 or data capable phone, the invention facilitates the data entry requirements. The invention can insert preference data into the stream of information that is passed between the consumer at 32, 36 and commercial provider 20. The invention recognizes markers or tags 22 that commercial partner 20 uses as keys to the customer-entered values or preferences. Since these markers 22 can be agreed upon a priori, the consumer's data is present, and the present invention maintains the customer-specific values for the markers, the values are written to the stream via proxy server 40 as the tags are identified. This is also shown in FIG. 3.

b. Standard Tags

The present invention can allow for a set of predetermined markers or tags to be used by many commercial partners, given that none of said markers are tags have partner-specific meaning. A specific embodiment of this could be a number of partners and the present invention all conforming to some standard, such as Electronic Commerce Markup Language (ECML). The partner need only notify the present invention through any number of the invention's interfaces that it is a participant in the standard, and the partner can than be fully integrated. As shown in FIG. 6, vendor 20 can interact with tag database 24B via servlet 21 using HTTP. The servlet can interact with tag database 24B using Java Database Connectivity (JDBC).

c. Default Policies

If the information required by the commercial partner is not known, a default entry can be provided to the consumer. For example, if the consumer is ordering a men's dress shirt, and has previously stored credit and identity information in the consumer database, the shirt retailer may send an HTML page having standardized fields (set forth by the network provider and the present invention) for identity and credit information, as well as neck size, sleeve length, collar type and color. Individual tags can be associated with each field such that, when the HTML page is parsed by the application of the present invention, the fields corresponding to identity and credit information are pre-populated into the HTML page, and the remaining fields are left as default values. Default values and/or indicators can be pre-set according to the preferences of the consumer, the commercial partner or the network operator. Dialog types can than be modified and/or pre-set according to preferences and/or default policies. A specific embodiment of a default policy could be to either fill in a class of default values such as marketing opt-in/opt-out options, or simply to fill in nothing.

d. Dialog Modification

The present invention not only can insert preference or choices for certain dialogs, but it can also substitute difficult dialogs for easier ones if the commercial partner and network operator so desire. For example, if the shirt retailer provides text fields for neck size and sleeve length, such dialogs may be difficult to enter for a consumer in a limited input environment without a keyboard. Thus, the consumer may desire that the dialogs be presented in a drop-down menu or radio button format.

III. Interruption of Workflow

If the consumer has stored more than one possible input value (or there are conflicting policies of equal importance), the present invention presents the consumer with a list of selectable options either inline with the page or in an augmented workflow (with the mechanism below), otherwise it automatically fills the appropriate value, rather than cumbersome text areas to make transaction and signup processes more efficient.

Figure 2:
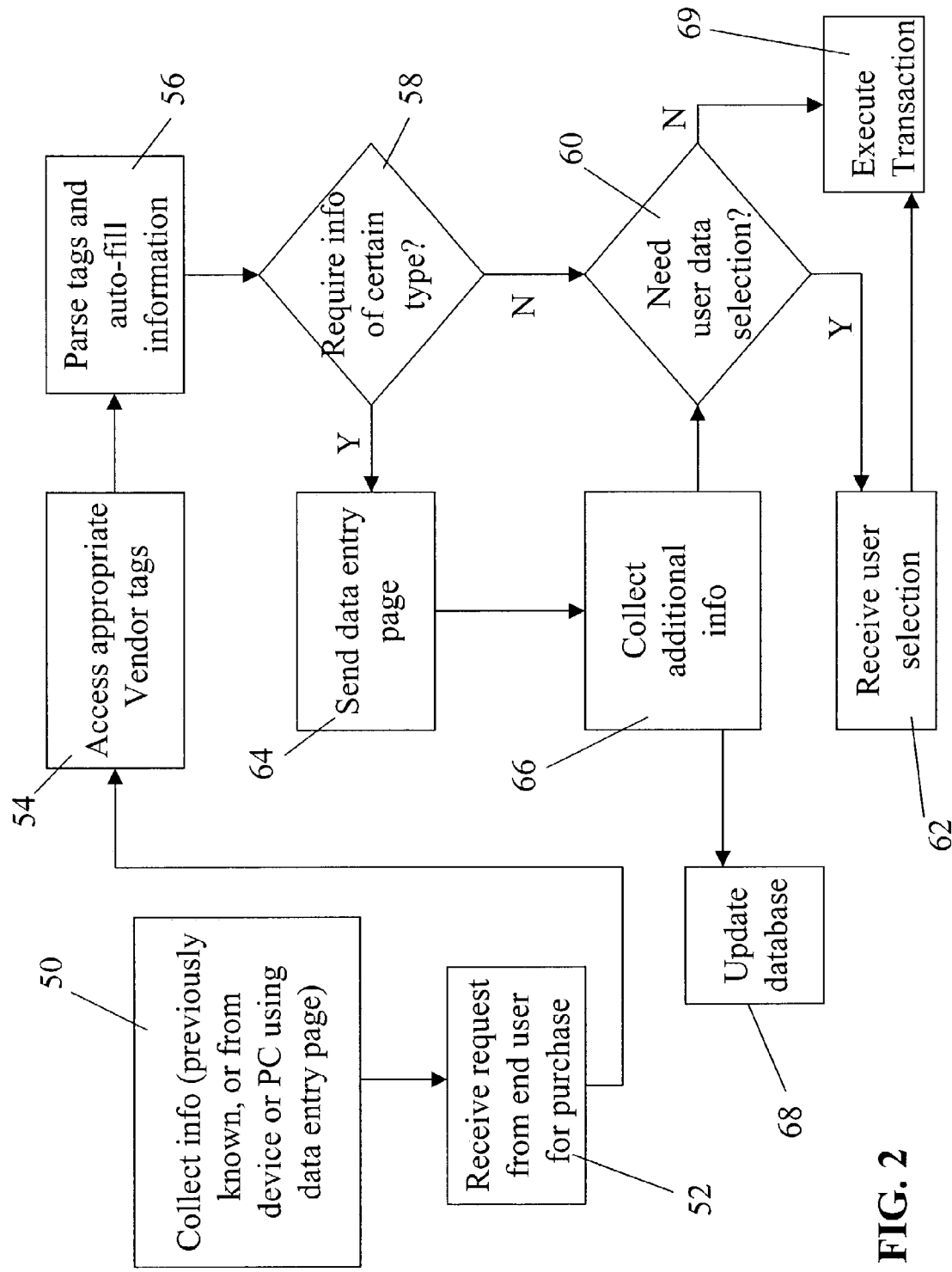
FIG. 2 is a flow chart showing the process by which a customer purchase can be made using the system of the present invention.
Figure 8:
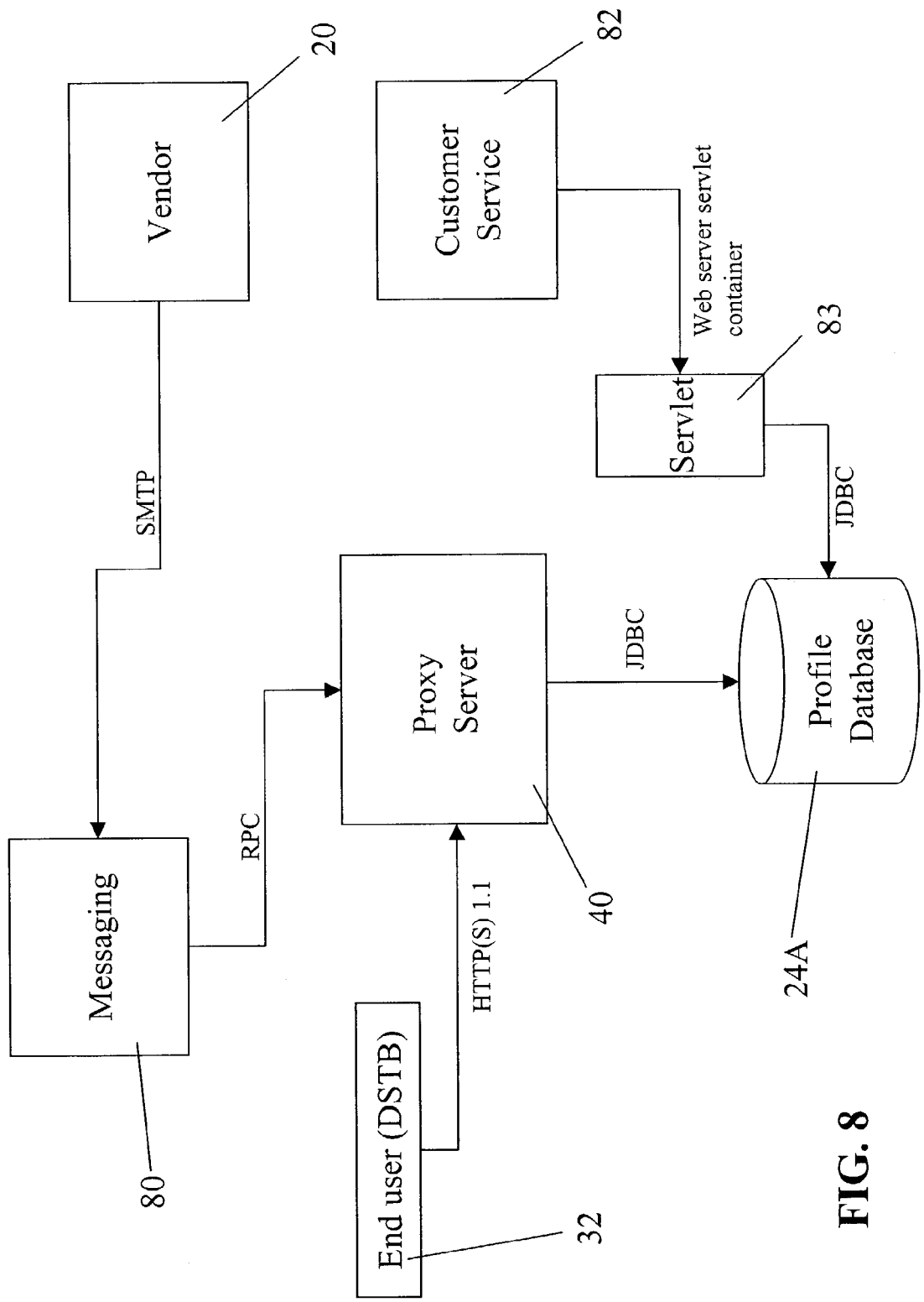

FIG. 2 shows a flow diagram of process steps in accordance with one embodiment of the invention. As shown in FIG. 2, the system can collect any initial information at 50, and can receive a purchase request 52 from consumer. Next, the proxy server accesses the tag database 54 for the tags associated with the particular vendor involved and fills the information 56 into the vendor page according to data in the consumer database. If further information is required 58 to consummate the transaction, the customer can then be presented with a separate data entry page as at 64 or default values which may or may not require consumer confirmation. Once obtaining any new information at 66, the database can be updated as at 68 so as to provide even greater efficiencies in future transactions involving the consumer. If no further information is required, yet the user has multiple profile information values for a particular field, for example, the system of the present invention can send a data selection page 60 where the user can select which profile and/or standard information they would like to use, as at 62. Once all information required for a transaction is presented, the transaction can be consummated as at 69. As shown in FIG. 8, once the transaction has occurred, the vendor can send an e-mail confirmation via messaging component 80, and customer service component 82 can send order confirmation via servlet 83, accessible via the profile database.

If the consumer has requested content, the network operator can interrupt or augment with additional user interface components the commercial partner's workflow to gather identity or other information from the user. For example, if the consumer is part of a household of five registered purchasers, and the consumer accesses information about toys, the network operator may suspend the consumer's interaction with the commercial partner while determining which profile to invoke for the household. In doing so, the consumer's content requests and the commercial partner's responses can be cached while the identity information is obtained or will be filled after a selection.

Since the present invention does the work of inserting the end consumer's billing and shipping addresses and credit card information, the consumer in one embodiment simply has to select their product and the desired shipping and billing information from outside the commercial partner's interface in order to execute a transaction, which can be automatically chosen as well.

IV. Input Methods

There are a variety of ways of attaining the user's data:

a. Web Page

As shown in FIGS. 1 and 5, because the client's input device can be limited, the user's profile can be managed via PC 36 using a branded interface 38 on the World Wide Web. The authentication used on the web interface could be the same account information used on the device, allowing for simplified profile management and fewer forgotten passwords. In one embodiment, the user can communicate information to database 24 via servlet 41 using a servlet container. The servlet can interact with profile database 24A using Java Database Connectivity (JDBC) 42. It will be appreciated that database 24 can comprise multiple separate databases (for example, 24A and 24B in FIGS. 5 through 8) or a single database.

b. Interactive Workflow

In a further embodiment of the invention, the unknown information required by the commercial partner can be presented in a separate data entry page for the consumer. Such a page may be desirable where a more difficult data entry process is requested, such as the text of a greeting card, for example. Information requests can be placed in the aforementioned augmented or interrupted workflow as well as a separate area provided by the network operated accessible at any time before possible transactions.

c. Existing Database Import

As shown in FIG. 5, the present invention can also import data from external databases, such as service provider database 43. A specific embodiment could be either a batch load as at 45 for a number of accounts from an existing billing system or single account setup from a customer service interface.

d. First Time Transaction Data Entry

The present invention also recognizes when a consumer attempts to use the system does not have an existing profile in the system. When such cases arise, the present invention interrupts workflow (via aforementioned mechanism), and presents augmented workflow for the new consumer to register with the system. A particular embodiment of this is the present invention catching the consumer clicking "checkout" and offering a setup page if the consumer wishes to continue. An additional embodiment is the present invention recognizing that the consumer lacks a profile yet has a default policy registered to not offer registration (opt-out), and the present invention allows the commercial partner workflow to continue.

V. Transaction Recognition

The present invention also interprets appropriate commercial partner documents to determine information that is descriptive or required to consummate a transaction from the partner. The present invention then presents this information to the interactive television, mobile data, or internet consumer in a format which is simple to navigate and complete, and which may be pre-populated with relevant customer data to the extent the data has been obtained.

VI. Tag Registration a. Introduction

The present invention allows the network provider to expose an interface to the commercial partners for easy integration of standard or custom tags or markers. The present invention allows partners to enter their specific tags or markers through the appropriate protocol plug-in, and match them to internal markers already determined in the system. Through this interface, partners can check what the system is already looking for, what it has the potential to look for, and request new tags or markers to be analyzed.

b. Integration

The present invention provides a solution for commercial partners and network providers who require information and content integration. The present invention not only facilitates this integration, but also provides records of agreement and manages the relationships. The present invention also allows the vendors to maintain their branding and acquire the particular customer information they need, while requiring no more integration than if the vendor had direct access to the customer's browser. Because of this tag matching and modifying procedure, the customer is provided with the look-and-feel intended by the commercial partner, including the page layout, workflow, and custom and non-custom content.

In terms of users, a provider's customer is generally not one person, but instead an entire household. Each household consists of multiple users, and each user may wish to have multiple methods of payment, multiple locations for goods to be shipped to, and multiple preferences that are vendor specific. The present invention accommodates any household type, whether that includes a single user with a single billing and shipping address related to a single credit card, or multiple users, with one or more different addresses per user, and one or more payment types. Furthermore, the present invention enhances the abilities of a roaming user by providing for data entry from a PC, as well as a DTSB or PDA, as shown in FIG. 1.

c. Mechanism

A specific embodiment of this function can be a web page that displays all known internal HTML tags: CAULDRON_FIRST_NAME, CAULDRON_LAST_NAME, CAULDRON_FULL_NAME. When the partner access the web site, the content developer can register all intended HTML tags to be used or already in use by matching them to the internal tags: CAULDRON_FIRST_NAME & PARTNER_FNAME, CAULDRON_LAST_NAME & PARTNER_LNAME, etc.

d. Motivation

The commercial partner can provide certain field descriptors that depict the information needed from a customer in order to purchase the vendor's goods or services. This information can be provided electronically or "offline" and is stored in a partner transaction or tag database, as shown in FIGS. 1 and 7, for example. As an example, an airline may need identity and credit information, as well as seating preference, meal preference, and date and time information in order to process a request. Conversely, a shirt retailer may need size and color information in addition to identity and credit information. When such commercial partners register their field descriptor tags with the system of the present invention, they are stored in the partner transaction database. As such, whenever a consumer requests content from a commercial partner or vendor, the partner can provide its generic content page with tags, and the present invention parses the page for tags and inserts consumer values, if known, which correspond to the partner's tags. As shown in FIG. 7, consumer 32 can request information, which request is processed through proxy server 40 to vendor 20. Vendor returns content information containing tags, whereby the information is received and parsed by proxy server 40. In parsing the electronic information, proxy server invokes programming which accesses tags from tag database 24B and associated consumer information from profile database 24A to pre-populate the electronic form for the consumer. It will be appreciated that a variety of types of commercial partners are encompassed by the present invention, including merchants of goods and services, content providers, contest operators and other entities who may interact with consumers in the course of conducting commerce and transactions.

e. Standard Tags

In another embodiment, commercial partners need not identify required information prior to involvement in electronic transactions. In such instances, the system of the present invention can parse the electronic pages intended for a consumer to identify fields or tags similar to known tags already stored in the partner transaction database. If the system recognizes common tags, such as those listed in agreed standards like ECML (as discussed above), these tags can be associated with the new commercial partner and stored in the transaction database. The invention can further pull consumer values associated with the particular tags prior to delivering the content page to the consumer. In this way, new commercial partners can be readily integrated into the system of the present invention without previously identifying their tags with the system.

Implementation

Figure 4:
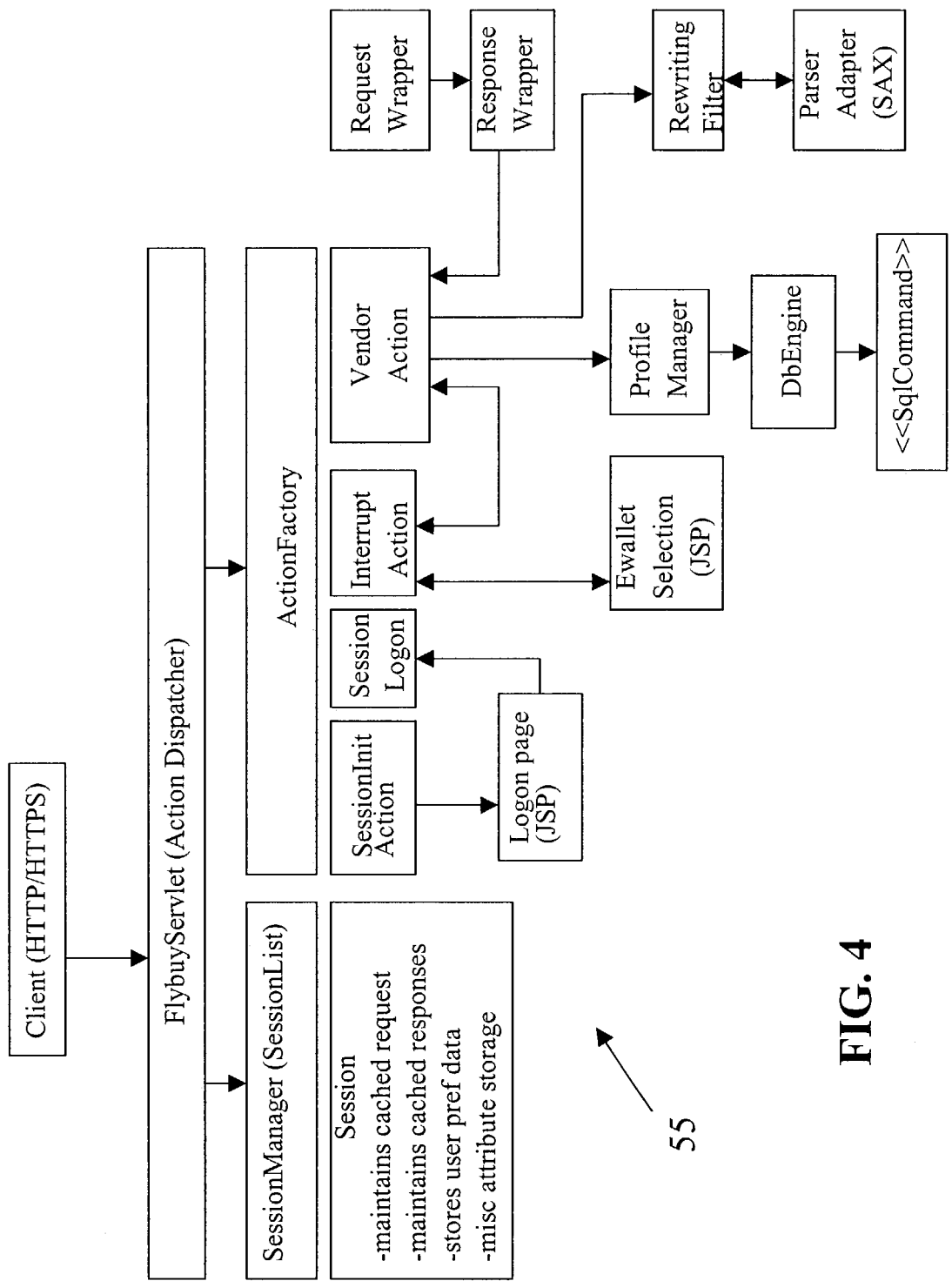
FIG. 4 shows one embodiment of an architecture diagram for use in implementing the system of the present invention.

FIG. 4 identifies one embodiment of a detailed internal code architecture 55 of one implementation in the Java language. This embodiment can handle synchronous HTTP protocol and HTML dialog modification with workflow interruption while using the HTML tag registration, parsing and modification as discussed above.

Core Code Components (Example Embodiment)

The application of one embodiment of the present invention is generally comprised of 6 packages:

FlyBuy™.servlet: Core Server objects that exist across all requests

FlyBuy™.parser: HTML Parsing classes including 3$^{rd}$ Party code and adapters.

FlyBuy™.state: Request level classes maintained on a per user basis.

FlyBUy™.store: Persistence classes for managing Database interaction.

FlyBUy™.auth: Classes for managing authenticity keys and approvals.

FlyBuy™.action: Handlers for all expected behaviors and required actions of the present invention.

Server Startup flybuy.servlet

On startup, the servlet container loads the FlybuyServlet with the ServletConfig object from the container configuration file. FlybuyServlet then loads its custom configuration file, flybuyConfig.xml, and creates a FlyBuyConfig object (which is a singleton and can be accessed from anywhere). Before finishing, FlybuyServlet instantiates the chosen Authentication scheme for managing authenticity of the client. FlybuyServlet is now ready to receive HttpServletRequest and HttpServletResponse objects from the container.

Request Dispatching flybuy.servlet, flybuy.state, flybuy.action

When the service function is called in FlybuyServlet, the FlybuyServlet must manage two tasks. First, it must request any previously stored session or the creation of a new session depending on whether the client has previously logged in (all sessions, new and old, are managed by the SessionManager). Secondly, the FlybuyServlet must derive the appropriate Action either from internal logic based on what the present application already knows about the client or from what is indicated in a custom request from the client as a result of a system interruption page. Once the Session has been acquired and the appropriate Action is derived and acquired from ActionFactory, FlybuyServlet executes the action and the correct allocated action takes over the remaining service fulfillment.

Authentication flybuy.auth, flybuy.action

Classes wishing to manage authentication must implement the interface. Session keys are stored in secured cookies that are checked by the FlybuyServlet; thus, every request is authenticated. During ServletLoginAction, the Authenticators generate the key that will be used for the duration of the session. For each subsequent request the key is requested from the cookie, and verified by the implemented method in the Authenticator. The only Authenticator included with this release is BasicAuthentication which only checks username and password combinations, and verifies session keys.

Session Data flybuy.state, flybuy.action, flybuy.store

With all requests per user login session, there is an associated Session object. The Session object contains the authentication key for maintaining tight security and any cached HTTP requests and responses that need to be held while the user selects which profiles to use as well as client network connection information. The Session object is also the central point for all data required to manage the request and insert user-defined values into the necessary vendor form fields.

After authenticity of the user has been initially confirmed in ServletLoginAction, the ProfileManager is called upon to gather the entire appropriate vendor and profile data associated to the hostname and user, respectively. The ProfileManager encapsulates all this data into a UserData object, which is returned and maintained in the user's Session object. The UserData object not only maintains the mappings of vendor specific tags to a list of profiles which can have the data to fill the forms, but also a running list of selected profiles, so the user is interrupted as few times as possible.

Content Rewriting flybuy.state, flybuy.action, flybuy.parser

For every request routed through the present application, the Parser and RewritingFilter are instantiated and work together to resolve any fields that may need completion on behalf of the client. If the user has already selected the appropriate data or if there is only one choice, the RewritingFilter automatically fills the data. If there is ambiguity about which profile data to complete the form with, the InterruptAction must be called to present the user with the appropriate options.

Handlers flybuy.action

As stated in Request Dispatching above, the flybuy.action classes are the handlers for every required behavior. System internal logic for deriving the appropriate action is first determined by checking if the session is marked new. If the session is not new, the parameter list of the HTTPServletRequest is checked for an fb_action key, which is an indicator of the submission of an application JSP, and the value is translated into the appropriate action name. If the session is not new, and there is no fb_action in the parameter list, a default action is taken, namely, ServletVendorAction.

Currently there are six flybuy.action classes, each of which extend the AbstractServletAction and are created from the ActionFactory. SessionInitAction is created if the Session object is marked as new, and its job is to store the HTTPServletRequest in the Session, and forward the client to the login.jsp. The login.jsp indicates the next action to take is SessionLoginAction. The SessionLoginAction authenticates the user and gathers the profile and tag data for the user and site, before retrieving the cached HTTPServletRequest and fulfilling it.

ServletVendorAction handles all normal requests routed through FlyBuy, and calls upon the Parser and RewritingFilter objects to check for any forms that may need completion. As mentioned earlier, if there is any choice that user must make for the forms to be filled, an interrupt page must be sent to the client so the user can make his/her choice. Once the Parser and RewritingFilter have determined all the options to be completed by the user, the Vendors response is stored in the Session and a UserDataException with the necessary information is thrown to the ServletVendorAction. The ServletVendorAction then forwards the client to the JSP that presents the options. When the client submits, the InterruptAction is called as per the value of fb_action (embedded in the JSP previously sent) and the choices are then set in the user's Session's UserData object. The InterruptAction then calls the ServletVendorAction with the cached Vendor Response and the process can continue.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A method for facilitating electronic transactions between a consumer and a plurality of commercial partners in a content network, comprising the steps of:

providing a database for storing consumer profile information with associated tag data;

establishing a bi-directional communications link between said consumer and at least one of said commercial partners for the transfer of electronic information;

receiving and storing target content information from a plurality of commercial partners, each of said commercial partners having an associated commercial transaction page, different from one another, for conducting said transfer of electronic information with said consumer, said target content information from each commercial partner including at least one data field descriptor for which at least one value is required by said commercial partners to consummate a transaction with said consumer; and receiving from each commercial partner a data field tag information for each of said data field descriptors for which at least one value is required from said consumer, wherein said data field tags are common to all commercial partners, said data field tag information for each of said data field descriptors corresponding to a potential consumer profile information among said stored consumer profile information with associated tag data;

upon said consumer initiating a request for electronic information from a first one of said plurality of commercial partners, parsing the electronic information returned by said first commercial partner for data field tag information for each of said data field descriptors for which at least one value is required from said consumer;

retrieving consumer profile information with associated tag data that corresponds to said data field tag information for each of said data field descriptors for which at least one value is required from said consumer;

inserting said consumer profile information into respective data field descriptors within said returned electronic information; and delivering said electronic information to said consumer.

2. The method of claim 1 comprising the further steps of storing preference information from at least one of the group consisting of the consumer, the commercial partner, or an operator of said content network; and modifying said electronic information based upon the preferences of at least one of said group.

* * * * *